Jan. 10, 1939.    J. KORPAN    2,143,353
DOUGHNUT MAKING APPARATUS
Filed Feb. 17, 1938
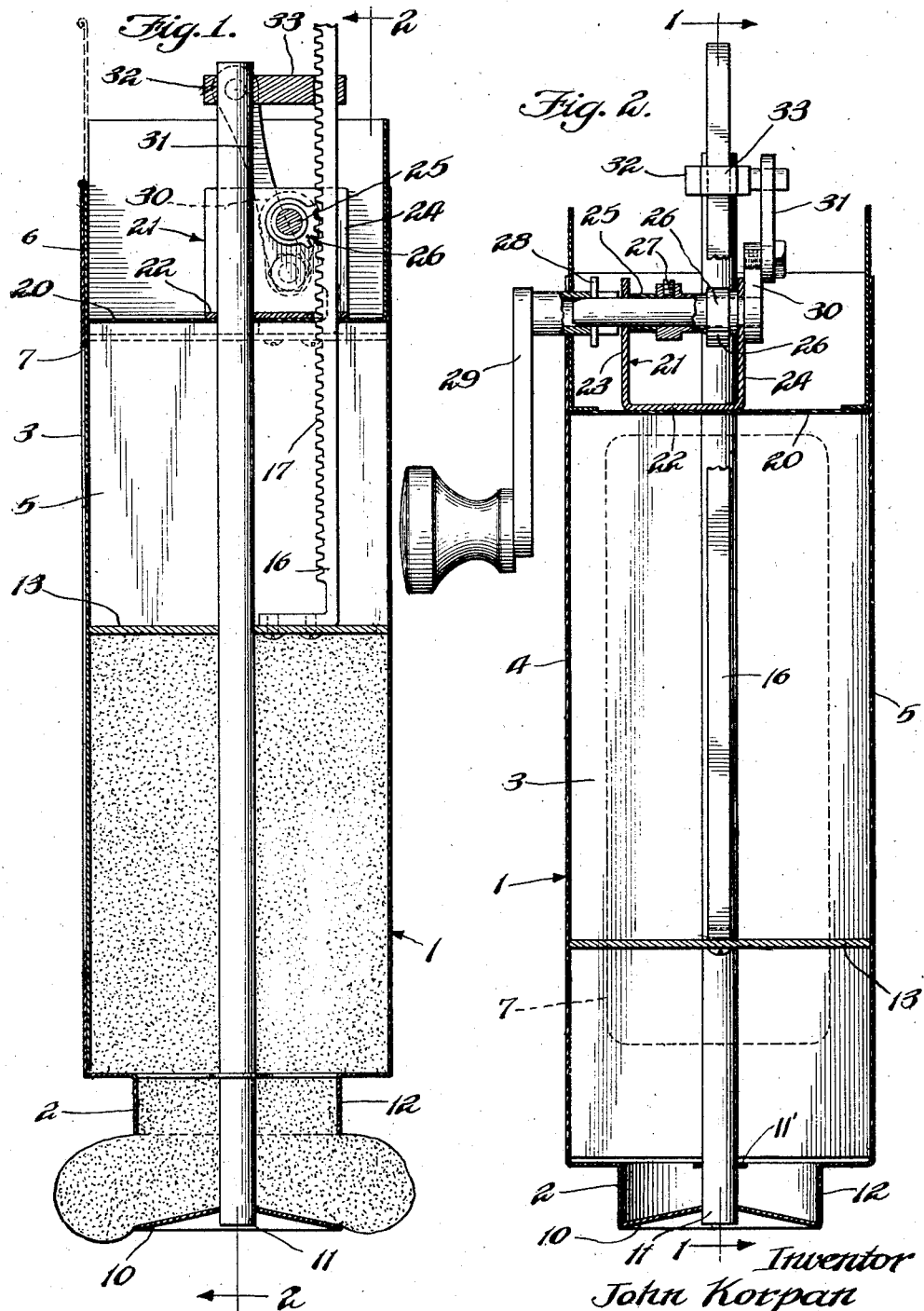
Inventor
John Korpan
By Morris Spector,
Atty.

Patented Jan. 10, 1939

2,143,353

UNITED STATES PATENT OFFICE 2,143,353

DOUGHNUT MAKING APPARATUS

John Korpan, Chicago, Ill., assignor, by mesne assignments, to Master Doughnut Machine Company, Chicago, Ill., a corporation of Illinois Application February 17, 1938, Serial No. 191,048

6 Claims. (Cl. 107—14)

This invention relates to aliment forming apparatus and particularly apparatus for forming doughnuts or the like.

It is one of the objects of the present invention to provide a device for forming doughnuts, pastries, confectionery or the like of the required shape, which apparatus shall be simple and economical of construction, reliable in operation, and which may be made sufficiently small and portable for domestic usage.

It is a further object of the present invention to make a portable apparatus which may be used for forming doughnuts or the like, and which is of such size and mode of operation that it may be held in the hand and manually operated to effect the desired result without unduly tiring the operator.

It is a still further object of the present invention to provide a doughnut forming machine of such size that it may be held in the hand during normal use, and by a continuous operation of an operating element will cause operation of a dough advancing member intermittently, and will cause operation of a dough forming or cutting member, the operation of the two members being so correlated that the advance of the dough is stopped during a proper portion of the motion of the cutting member, the dough advancing member being released during a portion of the stroke of the cutting member.

It is a still further object of the present invention to provide a device of the above character which shall be extremely durable and of such construction as to be capable of being readily taken apart for thorough cleansing.

The attainment of the above objects of the present invention will be apparent when taken in conjunction with the drawing forming a part thereof.

In the drawing:

Figure 1 is a longitudinal sectional view through a doughnut making apparatus constructed in accordance with the present invention, said view being taken along the line 1—1 of Figure 2; and Figure 2 is a longitudinal sectional view taken along the line 2—2 of Figure 1.

The apparatus comprises a hollow casing 1 of a generally rectangular shape, having a circular extruding opening 2 at one end and entirely open at the opposite end. The top of the casing is closed by a cover 3 which slides between the side walls 4—5 and under a top wall 6 that has a large rectangular opening 7 therein. A cutting disc 10 is mounted on a rod 11 that is slidable longitudinally in the casing 1, along the center thereof. The cutting disc is guided adjacent the bottom end by a narrow cross bar 11' extending across the extruding opening 2, and welded or otherwise secured in place and is movable from the position indicated in Figure 1, where it permits the outward flow of dough or the like from the opening 2, to a position illustrated in Figure 2 wherein the cutting disc abuts against the cylindrical mouth 12 to cut the dough that has been extruded through the opening 2.

A rectangular plunger plate 13 fits snugly on the interior of the casing 1 and is longitudinally slidable in said casing. The plunger plate 13 has a central cylindrical opening through which the rod 11 is freely slidable. A gear rack 16 having gear teeth 17 is secured to the back of the plunger plate 13 below the rod 11 and maintains the plunger plate in a vertical position as well as moves the same within the casing.

A plate 20 at the open rear end of the casing 1 maintains the rigidity of the box-like structure. The rack 16 and the rod 11 are freely slidable through the plate 20. A U-shaped clip 21 has the bight portion thereof 22 welded or otherwise secured to the plate 20 and has a pair of projecting arms 23—24 which serve as guides for a rotatable shaft 25 that has a gear sector 26 locked thereto, as by a screw 27. The shaft 25 has a pin 28 extending therethrough and locked in place and is adapted to receive a removable handle 29 which fits over the shaft and has a pair of slots which embrace the pin so that upon rotation of the handle 29 the shaft 25 is rotated. On the outside of the arm 24 the shaft 25 has a crank 30 locked thereto, which crank is joined, by means of a connecting rod 31, with a collar 32 that is keyed to the rod 11. The connecting rod is pivoted to the crank and to the collar. The collar 32 has a downwardly projection portion 33 having an opening therein through which the rack 16 is freely slidable so that the collar guides the outer end of the rack.

The gear sector 26 has only four teeth thereon so that if the handle is turned through one complete revolution the rack 16 is advanced four teeth, being advanced only through approximately one-fourth of the turning movement of the handle and remaining substantially stationary during the other three-fourths of the turning movement of the handle. During each complete revolution of the handle the crank 30 and connecting rod 31 cause the rod 11 to move first in one direction and then in the opposite direction. It is thus apparent that upon continuous rotation of the handle the cutting disc 10 is reciprocated from the position illustrated in Figure 1 to the position illustrated in Figure 2 and the plunger plate 13 is advanced in a step by step manner. When the cutting disc moves in the opening direction, from the position illustrated in Figure 2 towards the position illustrated in Figure 1, the plunger plate 13 is being advanced to push the dough through the extruding outlet. The advance of the plunger plate 13 ceases slightly before the cutting disc has reached the position illustrated in Figure 1. Thereafter the plunger plate 13 remains stationary and the cutting disc 10 is retracted to cut a piece of the dough that has been extruded into the position illustrated in Figure 1. During the return movement of the cutting disc the plunger plate is not locked in position, since the circular non-toothed part of the gear sector 26 is over the rack 17. It is merely held against upward movement by the friction between the plunger plate 13 and the walls of the casing and the friction of the dough with the walls of the casing.

To use the apparatus, the plunger plate is moved to the extreme position indicated in dotted lines in Figure 1, the cover plate 3 is opened, and dough is placed in the container to fill the same between the plunger plate and the cutting disc 12, the cutting disc 10 being in the closed position. Thereafter the cover plate 3 is moved to its closed position and the apparatus is ready for use. The apparatus may be held in the left hand in a vertical position and the crank turned with the right hand, the apparatus being held over the container in which the doughnuts are to be dropped. It is thus merely necessary to turn the handle 28 continuously in one direction. With each revolution of the handle the plunger plate 13 is advanced an amount sufficient to cause the extrusion of the necessary amount of dough for making one doughnut, and the cutter disc 10 is operated to cut off the dough.

While I have here shown arrangement wherein the gear sector 26 has only four teeth, it is understood that a greater or lesser number of teeth may be employed.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A dough forming and cutting apparatus comprising a container for dough, said container having an extruding outlet, dough cutting means at said outlet, a plunger for advancing dough in the container, a rotary element, means associated with the rotary element for advancing the plunger during only a fraction of each revolution of the rotary element and releasing the plunger during the remainder of each revolution of the rotary element, and means associated with the rotary element for reciprocating the cutting means to open and close the outlet.

2. A dough forming and cutting apparatus comprising a container for dough, said container having an extruding outlet, dough cutting means at said outlet, a plunger for advancing dough in the container, a rotary element, means associated with the rotary element for advancing the plunger during only a fraction of each revolution of the rotary element and releasing the plunger during the remainder of each revolution of the rotary element, and means associated with the rotary element for reciprocating the cutting means to open and close the outlet, said two last named means which are associated with the rotary element being so correlated that the closing movement of the cutting means takes place during the portion of the revolution that the plunger is released.

3. A dough forming and cutting apparatus comprising a container for dough, said container having an extruding outlet at one end and an end plate at the opposite end with the sides of the container projecting beyond said end plate to form a pocket, a plunger between the end plate and the outlet for advancing the dough in said container to said outlet, a cutter closing said outlet and movable to an open position, a rod supporting the cutter and extending through the container and through the end plate into said pocket, a rack connected to said plunger and extending into said pocket, operating mechanism in said pocket and including an operating element and a driving connection between said element and said rod and rack.

4. A dough forming and cutting apparatus comprising a container for dough, said container having an extruding outlet at one end and an end plate at the opposite end with the sides of the container projecting beyond said end plate to form a pocket, a plunger between the end plate and the outlet for advancing the dough in said container to said outlet, a cutter closing said outlet and movable to an open position, a rod supporting the cutter and extending through the container and through the end plate into said pocket, a rack connected to said plunger and extending into said pocket, operating mechanism in said pocket and including a rotary element, a crank and connecting rod between the element and the rod for reciprocating the rod upon rotation of the element, and gearing between the element and the rack for advancing the rack with each revolution of the element.

5. A dough forming and cutting apparatus comprising a container for dough, said container having an extruding outlet at one end and an end plate at the opposite end with the sides of the container projecting beyond said end plate to form a pocket, a plunger between the end plate and the outlet for advancing the dough in said container to said outlet, a cutter closing said outlet and movable to an open position, a rod supporting the cutter and extending through the container and through the end plate into said pocket, a rack connected to said plunger and extending into said pocket, operating mechanism in said pocket and including a rotary element, a crank and connecting rod between the element and the rod for reciprocating the rod upon rotation of the element, and a driving gear driven by said element and in driving engagement with the rack during only a fraction of the motion of the gear whereby the rack is advanced in a step by step manner upon continuous rotation of said element.

6. A dough forming and cutting apparatus comprising a container for dough, said container having an extruding outlet at one end thereof, a movable cutting disc closing said outlet, a rod supporting said disc and extending through the container to the opposite end thereof, a rotary element at said opposite end of the container, means including a crank and connecting rod connecting said rotary element with said rod so that upon rotation of the element the rod and the cutting disc are reciprocated to open and close said outlet, a plunger in said container movable towards the outlet to force the contents of the container through the outlet, a rack connected with said plunger for actuating the same, and a driving connection between the rack and the element for advancing the rack in a step by step manner upon continuous rotation of said element, said driving connection including means rotatable by the element and in driving engagement with the rack during only a fraction of each revolution of the element, said last named means being so correlated with said crank and connecting rod that the closing movement of the cutting disc takes place during the portion of the revolution of the element when said last named means is out of driving engagement with the rack.

JOHN KORPAN.